United States Patent [19]

Takeda

[11] Patent Number: 5,524,044

[45] Date of Patent: Jun. 4, 1996

[54] MOBILE TELEPHONE HAVING A PORTABLE TELEPHONE, VEHICLE-MOUNTED BOOSTER, VEHICLE-MOUNTED BATTERY AND A VOLTAGE REGULATOR

[75] Inventor: Mikio Takeda, Koube, Japan

[73] Assignee: Fujitsu Limited, Kawasaki, Japan

[21] Appl. No.: 120,274

[22] Filed: Sep. 10, 1993

[30] Foreign Application Priority Data

Mar. 19, 1993 [JP] Japan .................................. 5-059993

[51] Int. Cl.⁶ ............................................. H04Q 7/32
[52] U.S. Cl. ............................................. 379/58; 455/89
[58] Field of Search ............................ 379/58; 455/11, 455/89, 16, 17, 9, 20, 88; 330/127

[56] References Cited

U.S. PATENT DOCUMENTS

| | | | |
|---|---|---|---|
| 4,636,741 | 1/1987 | Mitzlaff | 330/127 |
| 4,654,882 | 3/1987 | Ikeda | 455/88 |
| 5,029,233 | 7/1991 | Metroka | 455/11 |
| 5,054,115 | 10/1991 | Sawa et al. | 455/89 |
| 5,193,219 | 3/1993 | Tamura | 455/89 |
| 5,369,803 | 11/1994 | Hirasawa et al. | 455/89 |

FOREIGN PATENT DOCUMENTS 2220328  1/1990  United Kingdom .

Primary Examiner—Curtis Kuntz
Assistant Examiner—William Cumming

[57] ABSTRACT

A mobile telephone apparatus connects a portable telephone terminal to a vehicle-mounted booster device and performs communication via a vehicle-mounted antenna. The apparatus includes means for detecting that the portable telephone terminal has been connected to the vehicle-mounted booster device, means for decreasing transmitting power of the portable telephone terminal to fixed level when the portable telephone terminal has been connected to the vehicle-mounted booster device, and means for performing control so as to vary the transmitting power of the booster device when the portable telephone terminal has been connected to the vehicle-mounted booster device.

2 Claims, 9 Drawing Sheets

MOBILE TELEPHONE HAVING A PORTABLE TELEPHONE, VEHICLE-MOUNTED BOOSTER, VEHICLE-MOUNTED BATTERY AND A VOLTAGE REGULATOR

BACKGROUND OF THE INVENTION

This invention relates to a mobile telephone apparatus and, more particularly, to a mobile telephone apparatus for connecting a portable telephone terminal to a vehicle-mounted booster device and performing communication via a vehicle-mounted antenna.

In a mobile phone system of the cellular type, as shown in FIG. 7, a service region is subdivided into a number of cells (wireless zones) $1_1, 1_2, 1_3, \ldots$, and the cells are provided with individual wireless base stations $2_1, 2_2, 2_3, \ldots$, respectively. The wireless base stations are formed into groups each having several of the base stations, a wireless line-control station (not shown) is provided for each such group of wireless base stations, the wireless line-control stations are connected to a mobile phone exchange (hereinafter referred to as a car phone exchange) 3, and the car phone exchange 3 is connected to an exchange 4 of a public telephone network. The cellular-type mobile phone system is so designed that as a portable telephone terminal 5 or car telephone terminal 6 moves, the wireless base stations that send and receive the radio waves are changed over from one to another so that communication can be achieved with an indoor fixed telephone 7 or another mobile telephone terminal. This makes it possible to carry on telephone conversations over a wide area and to increase the number of channels. The number of lines can be increased without limit as well.

When power is supplied to the mobile telephone terminals 5 and 6, the terminals scan the paging channels of the surrounding wireless base stations, receive the paging waves transmitted at all times from each wireless base station and tune to the channel of the station having the strongest signal. Thereafter, the terminals receive position information over this channel and compare this with position information already stored. If the two items of position information differ, each terminal sends an ID code, which has been stored in a ROM, to the wireless base station over the paging channel and registers position with the car phone exchange 3. As a result, the mobile telephone terminal enters a waiting mode. When the mobile telephone terminal moves and the strength of the received signal weakens, the terminal performs scanning again. In this way wireless base stations are changed over in successive fashion When an outgoing call is placed, the calling party enters the other party's telephone number from a control panel and presses a transmission key, whereupon the mobile telephone terminal sends its ID code and the called party's telephone number to the wireless base station over the paging channel and the wireless base station responds by transmitting the received information to the wireless line-control station (not shown). The latter decides the speech channel, notifies the mobile telephone terminal via the wireless base station and informs the car phone exchange 3 of the outgoing-call information and speech channel that has been decided. The car phone exchange 3 checks to determine whether the ID code contained in the call information received has been registered and, if the ID code has, connects the speech channel to the public telephone system. The mobile telephone terminal can then communicate with the called party's terminal via the designated speech channel.

During a telephone conversation, the reception field strength is checked. When the reception field strength weakens and falls below a set level, the wireless base station is changed over. More specifically, the speech channel is changed over to perform hand-off. In addition, the transmitting power of the mobile terminal is controlled in accordance with a command from the wireless base station. In automatic power control (APC) of transmitting power, when sensitivity improves as the mobile telephone terminal approaches the wireless base station, transmitting power is reduced by a command from the base station. Conversely, when sensitivity diminishes as the mobile telephone terminal becomes more distant from the wireless base station, transmitting power is raised in accordance with a command from the base station. In accordance with APC, transmitting power is capable of being variably controlled over eight stages of 4 dB each. Consumption of battery power can be suppressed by suppressing the transmitting power when sensitivity is high (i.e, when field strength is high). Conversely, by increasing transmitting power when field strength is low, the area reached by the radio waves is enlarged so that frequent changeover (hand-off) of the speech channel does not occur and there is less deterioration in voice quality. Since there is a momentary interruption in sound at the time of hand-off, this makes conversing unpleasant. Voice quality deteriorates when hand-off takes place frequently.

In view of this deterioration in voice quality caused by hand-off, maximum transmitting power of a portable telephone terminal should be enlarged. In order to raise transmitting power, however, the battery or antenna must be enlarged. This results in a larger apparatus, which is more difficult to carry about. For this reason, the specifications of a portable telephone terminal are a voltage of 6 V and a maximum transmitting power of 6 W in order to provide a terminal that is easy to carry.

It should be noted that even if transmitting power is reduced and the area covered by the radio waves contracts as a result, walking about while carrying on a telephone conversation using the portable telephone terminal does not pose a problem since the traveling speed is low and there is almost no hand-off of the channel.

However, in a case where the portable telephone terminal is taken into an automotive vehicle and is used for a call while the vehicle is traveling, the high traveling speed of the vehicle results in frequent hand-off, which invites a decline in sound quality. Accordingly, a booster device is installed within the vehicle and the portable telephone terminal is connected to the booster device when a telephone call is made from within the vehicle. The party using the portable telephone terminal communicates with another party via the antenna mounted on the vehicle.

FIG. 8 is a block diagram for describing a mobile telephone apparatus obtained by connecting a portable telephone terminal to a booster device. Shown in FIG. 8 are a portable telephone terminal 11, a terminal installing rack 12 provided in the vicinity of the driver of the vehicle, a booster device 13 provided in the trunk of the vehicle, an antenna 14 of the portable telephone terminal, a telephone antenna 15 mounted on the vehicle, a battery 16 mounted on the vehicle, and an ignition switch 17.

The portable telephone terminal 11 and the terminal installation rack 12 are suitably connected by a cord 18 provided on the installation rack 12, and the terminal installation rack 12 and booster device 13 are connected beforehand by a coaxial cable 19a and a power-supply line 19b. A voltage of 13.8 V from the vehicle-mounted battery 16 is supplied to a high-frequency circuit in the booster device 13 and a voltage regulator 12a in the terminal installation rack 12, the voltage is converted from 13.8 V to 6 V by the voltage regulator 12a, and the voltage of 6 V is applied to the portable telephone terminal 11. The voltage regulator 12a has the construction of a DC-DC converter, such as the construction illustrated in FIG. 9. As shown in FIG. 9, the voltage regulator 12a includes a chopper 12a-1 for chopping the DC voltage of 13.8 V at a prescribed frequency, a transformer 12a-2 capable of regulating output voltage, a rectifier 12a-3 and a constant-voltage circuit 12a-4 for outputting a constant voltage (=6 V).

The portable telephone terminal 11 and a duplexer 13a on the terminal side of the booster device 13 are connected by a coaxial cable 19a, and high-frequency amplifiers 13c, 13d for transmission and reception, respectively, are provided between the duplexer 13a and a duplexer 13b on the antenna side. The booster 13 is supplied with the voltage of 13.8 V from the vehicle-mounted battery 16 and is capable of outputting a maximum transmitting power of 3 W.

The transmitting section of the portable telephone terminal 11 applies high-frequency power amplification to a high-frequency signal obtained by frequency modulating a voice signal or data, and the amplified signal is applied to the transmitting high-frequency amplifier 13c of the booster device 13 via the coaxial cable 19a. The transmitting high-frequency amplifier 13c of the booster device 13 subjects the high-frequency signal entering from the portable telephone terminal 11 to further high-frequency power amplification so as to boost the transmitting power, which is then emitted from the antenna 15.

A signal received by the antenna 15 is subjected to high-frequency power amplification by the receiving high-frequency amplifier 13d of the booster device 13, after which the amplified signal is applied to the receiving section of the portable telephone terminal via the coaxial cable 19a so as to be demodulated to the original voice signal or data. The portable telephone terminal 11 performs transmission-power control and, in accordance with a command from a wireless base station, exercises control so as to vary the transmitting power of the high-frequency amplifier over eight stages from the minimum level to the maximum level (=0.6 W).

Thus, as set forth above, the booster device 13, which is supplied with a voltage of 13.8 V from the vehicle-mounted battery 16, is capable of outputting a maximum transmitting power of 3 W. As a result, the area covered by the radio waves is enlarged so that frequent hand-off will not occur even at a high traveling speed. This makes it possible to eliminate a deterioration in sound quality.

It should be noted that it is necessary to output a maximum transmitting power of 6 W even in a state in which the portable telephone terminal 11 is connected to the booster device 13. This means that the voltage regulator 12a provided on the terminal installation rack 12 must be capable of supplying a power of 6 W. This is a problem in that the rated capacity of each component is large, thereby increasing size and raising cost. In particular, since the space available within the vehicle compartment is limited, it is required that the terminal installation rack be made as small as possible. However, since the voltage regulator is large in size in the prior art, this is an impediment to reducing the size of the terminal installation rack.

SUMMARY OF THE INVENTION

An object of the present invention is to provide a mobile telephone apparatus in which, when a portable telephone terminal is connected to a vehicle-mounted booster device, the transmitting power of the portable telephone terminal can be made a low value of a constant level, e.g., a minimum level, and in which transmitting-power control, which is commensurate with sensitivity, can be performed to a degree equivalent to that of the prior art.

Another object of the present invention is to provide a mobile telephone apparatus in which the voltage regulator can be made small in size and low in cost.

According to the present invention, the foregoing object can be obtained by providing a mobile telephone apparatus, which is for connecting a portable telephone terminal to a vehicle-mounted booster device and performing communication via a vehicle-mounted antenna, with means for detecting that the portable telephone terminal has been connected to the vehicle-mounted booster device, means for decreasing transmitting power of the portable telephone terminal to fixed level when the portable telephone terminal has been connected to the vehicle-mounted booster device, and means for performing control so as to vary the transmitting power of the booster device when the portable telephone terminal has been connected to the vehicle-mounted booster device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (a) Overview of the invention

Figure 1:
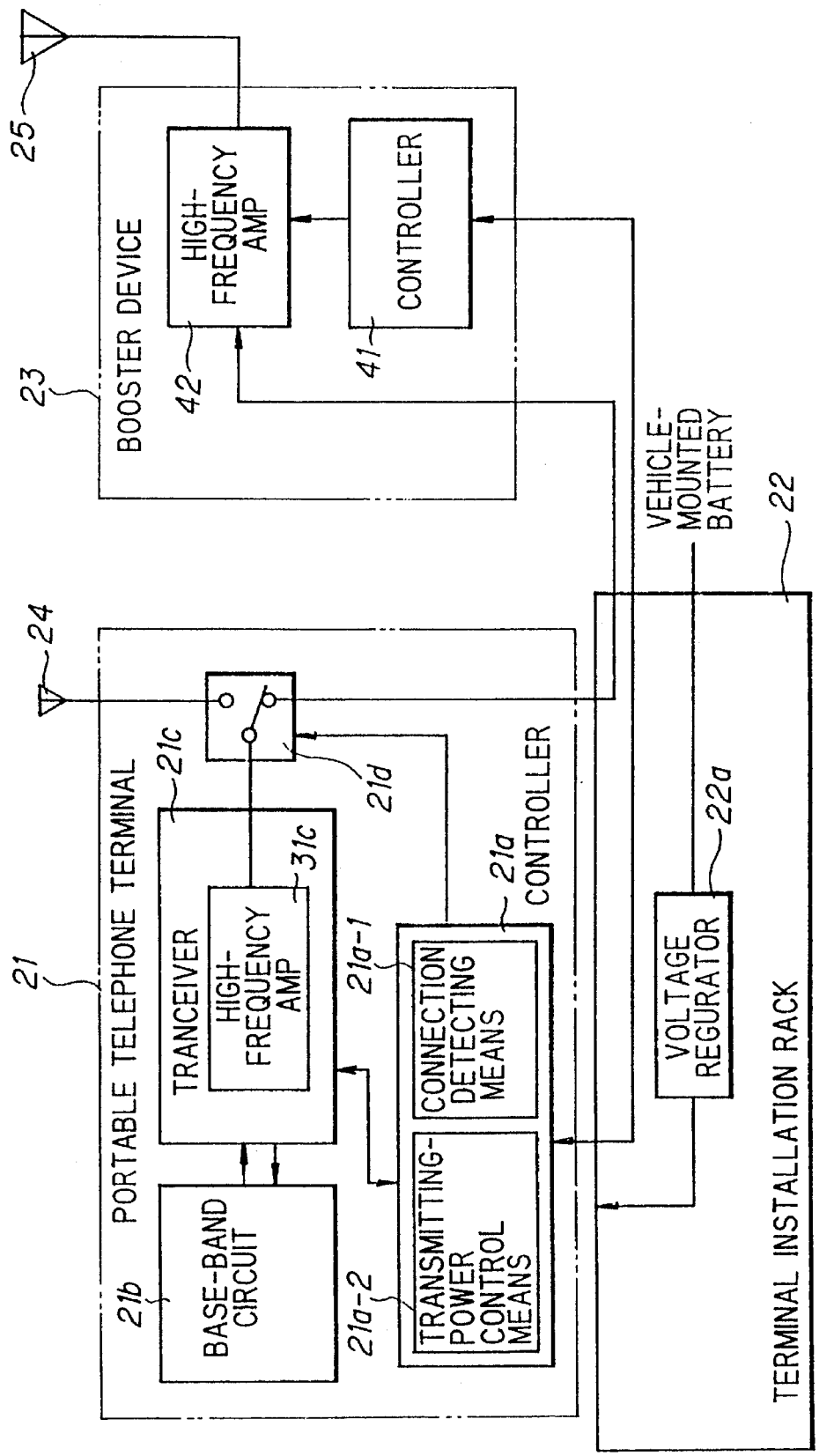
FIG. 1 is a block diagram for describing the principles of the present invention.

FIG. 1 is a block diagram illustrating the present invention.

Shown in FIG. 1 are a portable telephone terminal 21, a terminal installation rack 22 provided in the vicinity of the driver of the vehicle, a booster device 23 provided in the trunk of the vehicle, an antenna 24 of the portable telephone terminal, and a telephone antenna 25 mounted on the vehicle. The portable telephone terminal 21 includes a controller 21a, a base-band circuit 21b, a transceiver 21c and an antenna changeover unit 21d for introducing a high-frequency signal to the antenna 24 or booster device 23. The controller 21a includes connection detecting means 21a-1 for detecting that the portable telephone terminal 21 has been connected to the vehicle-mounted booster device 23, and transmitting-power control means 21a-2 for decreasing the transmitting power of the portable telephone terminal to a fixed level when the portable telephone terminal 21 has been connected to the vehicle-mounted booster device 23. The transceiver 21c has a high-frequency amplifier 31c for power-amplifying a frequency-modulated high-frequency signal. The terminal installation rack 22 is provided with a voltage regulator 22a for converting the voltage from a vehicle-mounted battery to 6 V and supply the portable telephone terminal 11 with the voltage of 6 V. The booster device 23 has a controller 41 for controlling transmitting power, and a high-frequency amplifier 42 for power-amplifying the high-frequency signal that enters from the portable telephone terminal 21.

The connection detecting means 21a-1 of the controller 21 performs monitoring to determine whether the portable telephone terminal 21 has been connected to the booster device 23 via the terminal installation rack 22. If the terminal 21 has been connected, the detecting means 21a-1 switches the antenna changeover unit 21d over to the booster side and the transmitting-power control means 21a-2 minimizes the gain of a high-frequency amplifier 31c so as to minimize the transmitting power of the portable telephone terminal 21. Further, the controller 21a informs the controller 41 of the booster device 23 of the fact that the connection has been made and sends data for transmitting-power control to the controller 41. When the controller 41 of the booster device 23 is informed of the connection, the controller 41 controls transmitting power by regulating the gain of the high-frequency amplifier 42 based upon the data for transmitting-power control. Thus, when the portable telephone terminal 21 has been connected to the booster device 23, it will suffice for the voltage regulator 22a to be capable of supplying the minimum power in order to minimize the transmitting power of the portable telephone terminal. The rated capacity of each component can be made small and the apparatus can be made small in size. This makes it possible to reduce the size of the overall voltage regulator and to lower the cost thereof. Further, by sending the data for controlling transmitting power from the side of the portable telephone terminal 21 to the controller 41 of the booster device, transmitting-power control commensurate with sensitivity can be performed in the same manner as before.

(b) Configuration of embodiment

Overall Configuration

Figure 2:
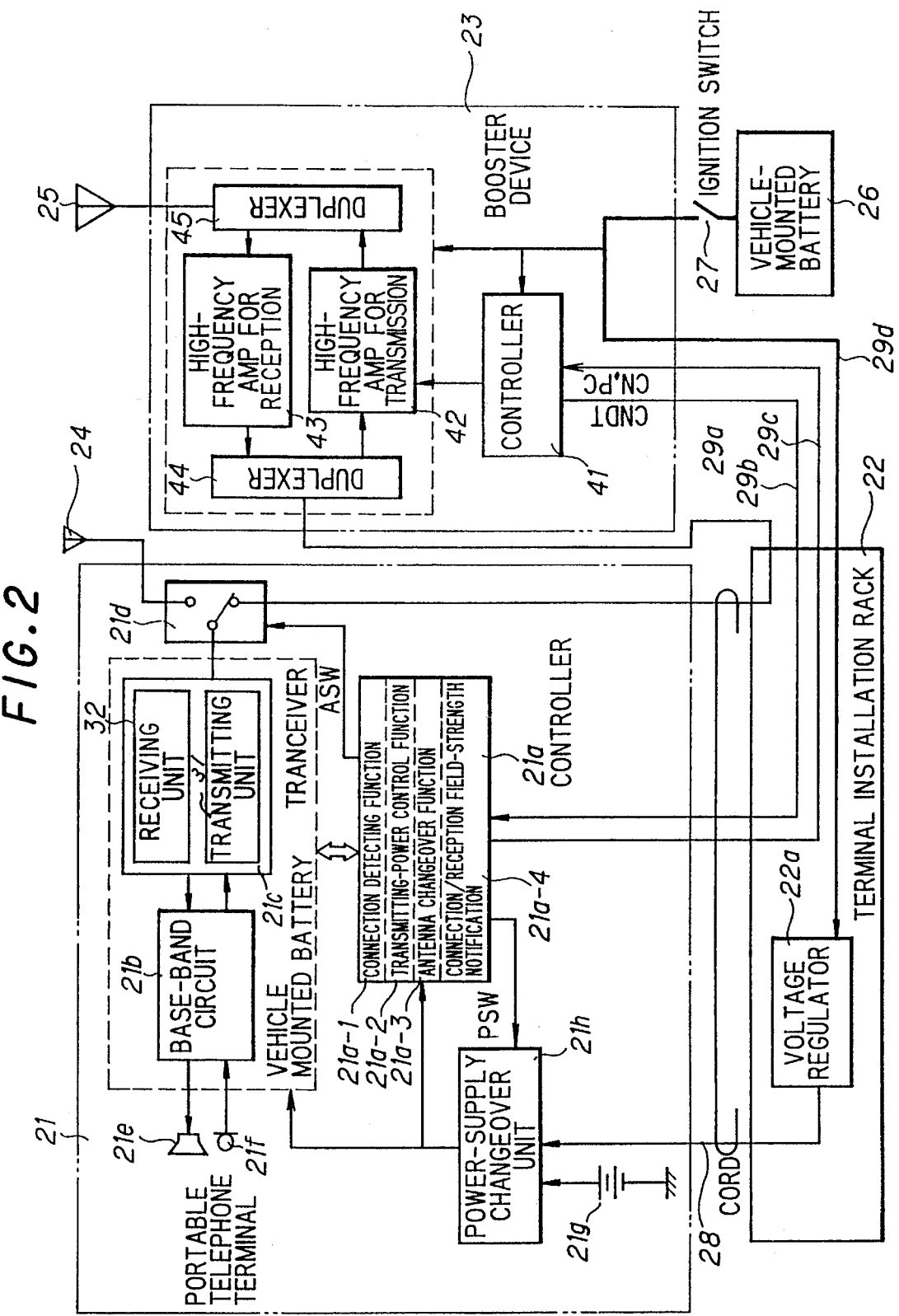
FIG. 2 is a block diagram showing the overall configuration of a mobile telephone apparatus according to the present invention.

FIG. 2 is a block diagram showing the overall configuration of a mobile telephone apparatus according to the present invention.

Shown in FIG. 2 are the portable telephone terminal 21, the terminal installation rack 22 provided in the vicinity of the driver of the vehicle, the booster device 23 provided in the trunk of the vehicle, the antenna 24 of the portable telephone terminal, the vehicle-mounted telephone antenna 25, a vehicle-mounted battery 26 and an ignition switch 27. The portable telephone terminal 21 and the terminal installation rack 22 are suitably connected by a cord 28 provided on the installation rack 22, and the terminal installation rack 22 and booster device 23 are connected beforehand by a coaxial cable 29a for high frequency, two serial-data lines 29b, 29c, and a power-supply line 29d.

Figure 9:
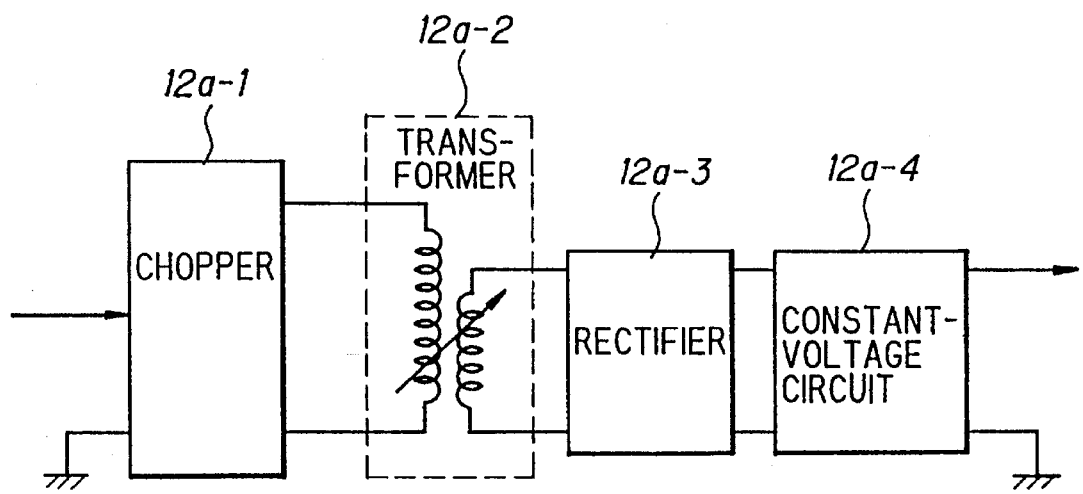
FIG. 9 is a block diagram of a voltage regulator.

A voltage of 13.8 V from the vehicle-mounted battery 26 is supplied to the controller and high-frequency circuits of the booster device 23 as well as to the voltage regulator 22a of the terminal installation rack 22. The voltage is converted from 13.8 V to 6 V by the voltage regulator 22a, and the voltage of 6 V enters the portable telephone terminal 21. The voltage regulator 22a has a construction identical with that according to the prior art shown in FIG. 9.

The portable telephone terminal 21 includes the controller 21a, which is constituted by a microcomputer for controlling the overall portable telephone terminal. The controller 21a executes positional registration control, outgoing-call control and incoming-call control, which are the intrinsic functions of a portable telephone terminal, as well as the following control functions in accordance with the present invention: (1) a connection detecting function 21a-1 for detecting that the portable telephone terminal 21 has been connected to the vehicle-mounted booster device 23; (2) a transmitting-power control function 21a-2 for decreasing the transmitting power of the portable telephone terminal to a fixed level (the minimum level, for example) when the portable telephone terminal 21 has been connected to the vehicle-mounted booster device 23; (3) an antenna changeover-control function 21a-3; and (4) a notification function 21a-4 for sending the booster device 23 a connection detection signal CN and data PC for controlling transmitting power.

The portable telephone terminal further includes the base-band circuit 21b and the transceiver 21c, which constitute the wireless unit. The transceiver 21c is equipped with a transmitting unit 31 for frequency modulating audio and data and outputting a frequency-modulated signal, and a receiving unit 32 for demodulating audio and data from a reception signal and inputting the demodulated signal to the base-band circuit 21b. The antenna changeover unit 21d introduces a high-frequency signal to the antenna 24 or booster device 23. The portable telephone terminal 21 further includes a speaker 21e, a microphone 21f, a 6 V battery 21g and a power-supply changeover unit 21h. When the portable telephone terminal 21 has been connected to the booster device 23, the power-supply changeover unit 21h supplies each component of the portable telephone terminal with the voltage outputted by the voltage regulator 22a.

The booster device 23 includes the controller 41, which is constituted by a microcomputer. The controller 41 executes (1) control for transmitting data CNDT, which is for detecting whether a connection has been made or not, and (2) control of the transmitting power of the booster device based upon the data PC for controlling transmitting power. Also included is the high-frequency amplifier 42 for transmission, which is for power-amplifying the high-frequency signal that enters from the transmitting unit 31 of the portable telephone terminal 21. The booster device 23 further includes a high-frequency amplifier 43 for reception, which is for amplifying the high-frequency signal received from the antenna 25 and applying the amplified signal to the receiving unit 32 of the portable telephone terminal, a duplexer 44 on the terminal side and a duplexer 45 on the antenna side. The transmitting high-frequency amplifier 42 is adapted to exercise control so as to vary transmitting power by controlling gain over eight stages. On the basis of the transmitting-power control data PC sent from the controller 21a of the portable telephone terminal, the controller 41 performs control so as to vary transmitting power by controlling the gain of the high-frequency amplifier 42.

Wireless Unit

Figure 3:
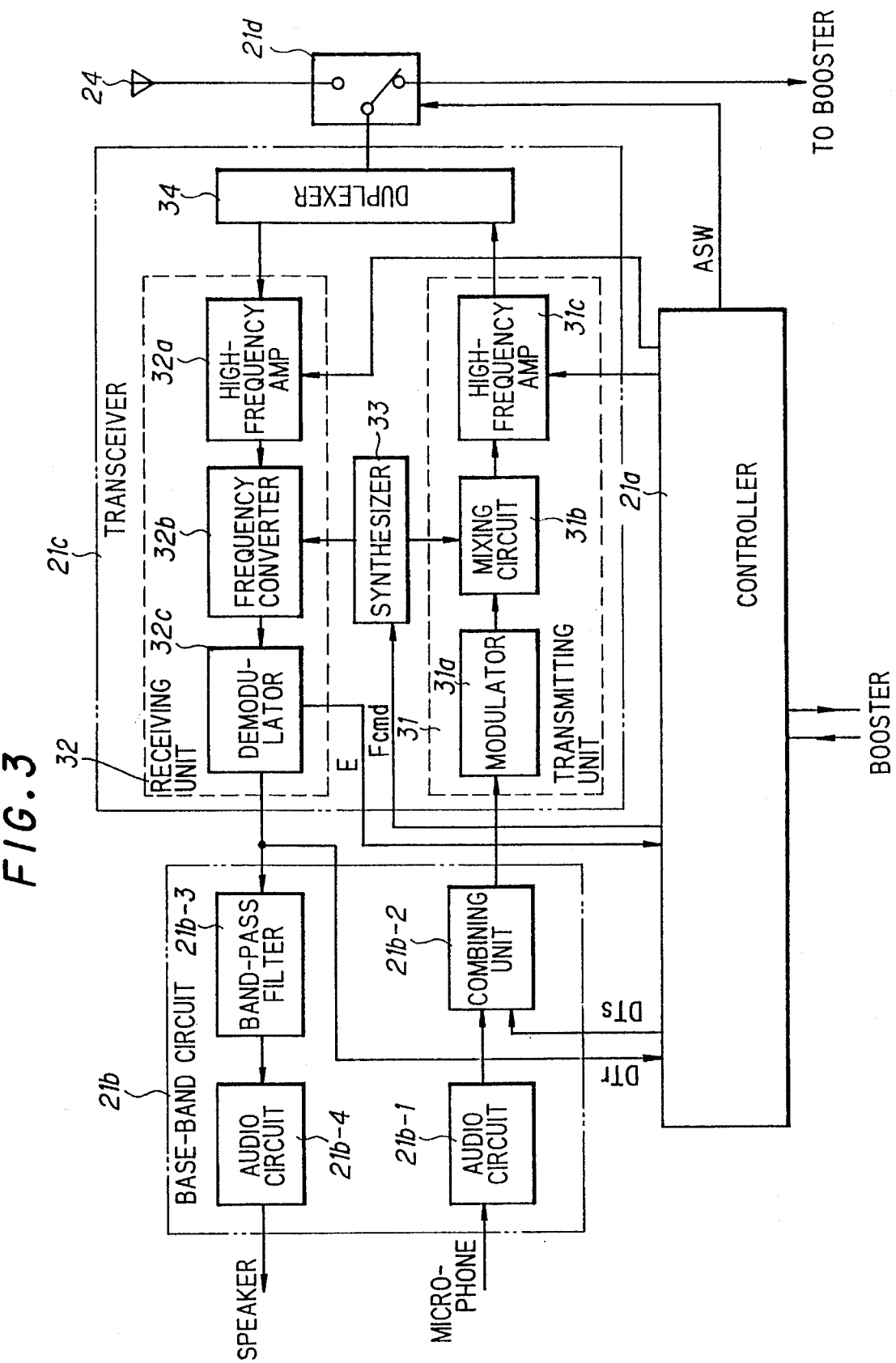
FIG. 3 is a block diagram illustrating a wireless unit.

FIG. 3 is a block diagram of the wireless unit. The base-band circuit 21b includes a first audio circuit 21b-1, which is composed of a band-pass filter and low-frequency amplifier, etc., for passing an audio signal of 0.3–3 KHz, a combining unit 21b-2 for combining the audio signal and transmission data DTs (10 Kb/s), which is outputted by the controller 21a, and applying the resulting signal to the transmitting unit 31, a 0.3~3 KHz band-pass filter 21b-3, to which the demodulated signal from the receiving unit 32 is applied as an input, for passing the audio signal contained in the demodulated signal, and a second audio circuit 21b-4 such as a low-frequency amplifier, the output of which enters the speaker. The demodulated signal enters the controller 21a as well. The controller 21a extracts data DTr sent from a wireless base station.

The transceiver unit 21c includes the transmitting unit 31, the receiving unit 32, a synthesizer 33 for generating a prescribed frequency signal in accordance with a command Fcmd from the controller 21a, and a duplexer 34 for changing over the high-frequency signal between the transmitting unit and the receiving unit. The antenna changeover unit 21d (1) connects the transmitting unit 31 and receiving unit 32 to the antenna 24 via the duplexer 34 in a case where the portable telephone terminal 21 has not been connected to the booster device 23, and (2) connects the transmitting unit 31 and receiving unit 32 to the duplexer 44 of the booster device 23 via the duplexer 34 in a case where the portable telephone terminal 21 has been connected to the booster device 23 (see FIG. 2).

The transmitting unit 31 includes a modulator 31a for frequency modulating audio and data, a mixing circuit 31b and a high-frequency amplifier 31c for transmission. The receiving unit 32 a high-frequency amplifier 32a, a frequency converter 32b for converting high frequency to intermediate frequency, and a demodulator 32c for applying a demodulated signal to the base-band circuit 21b and applying a reception field-strength signal E to the controller 21a. The high-frequency amplifier 31c for transmission is so adapted that the gain can be varied over eight stages from the minimum level to the maximum level by control performed by the controller 21a.

Overall Operation

Figure 4:
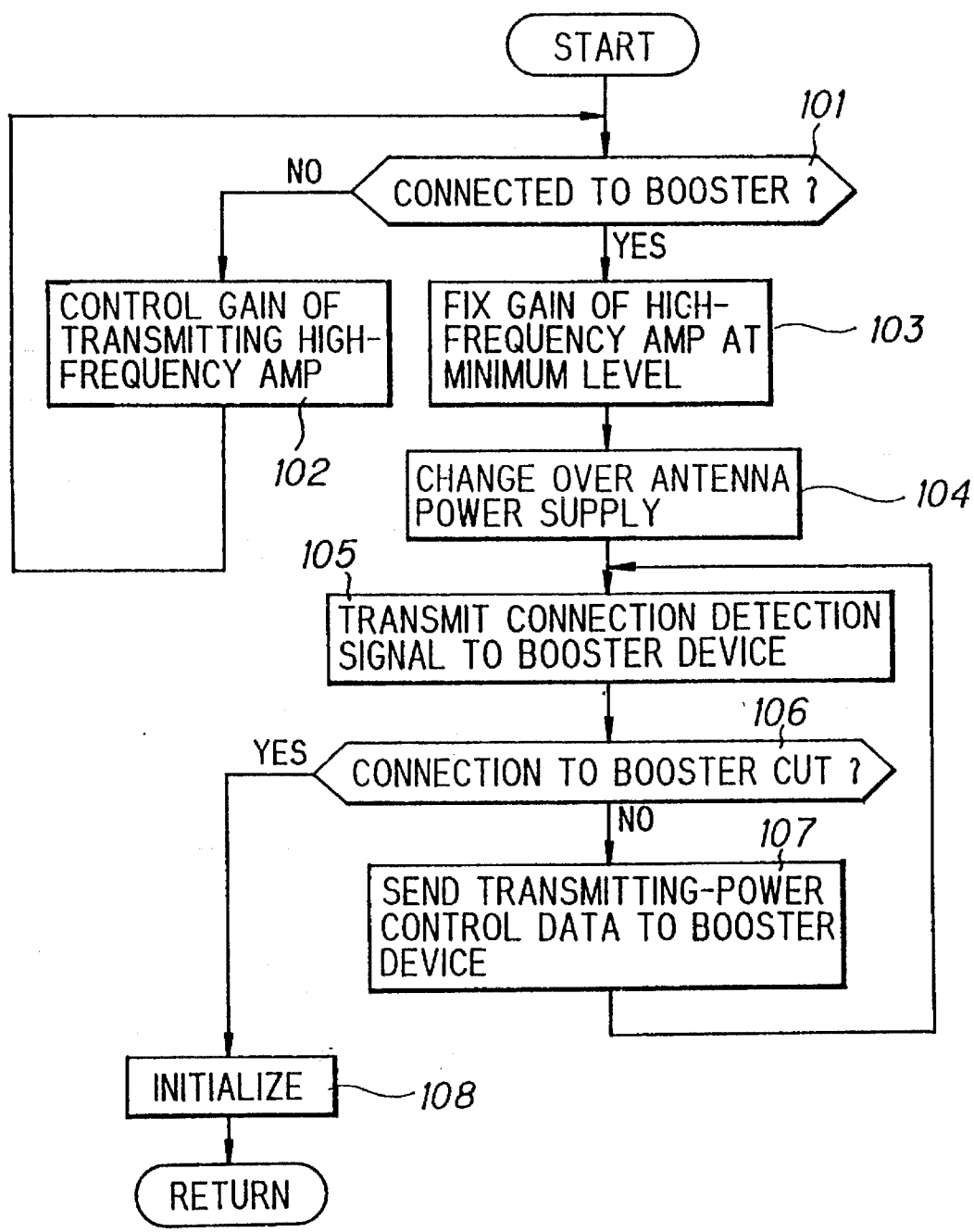
FIG. 4 is a flowchart of processing for controlling the transmitting power of a portable telephone terminal.
Figure 5:
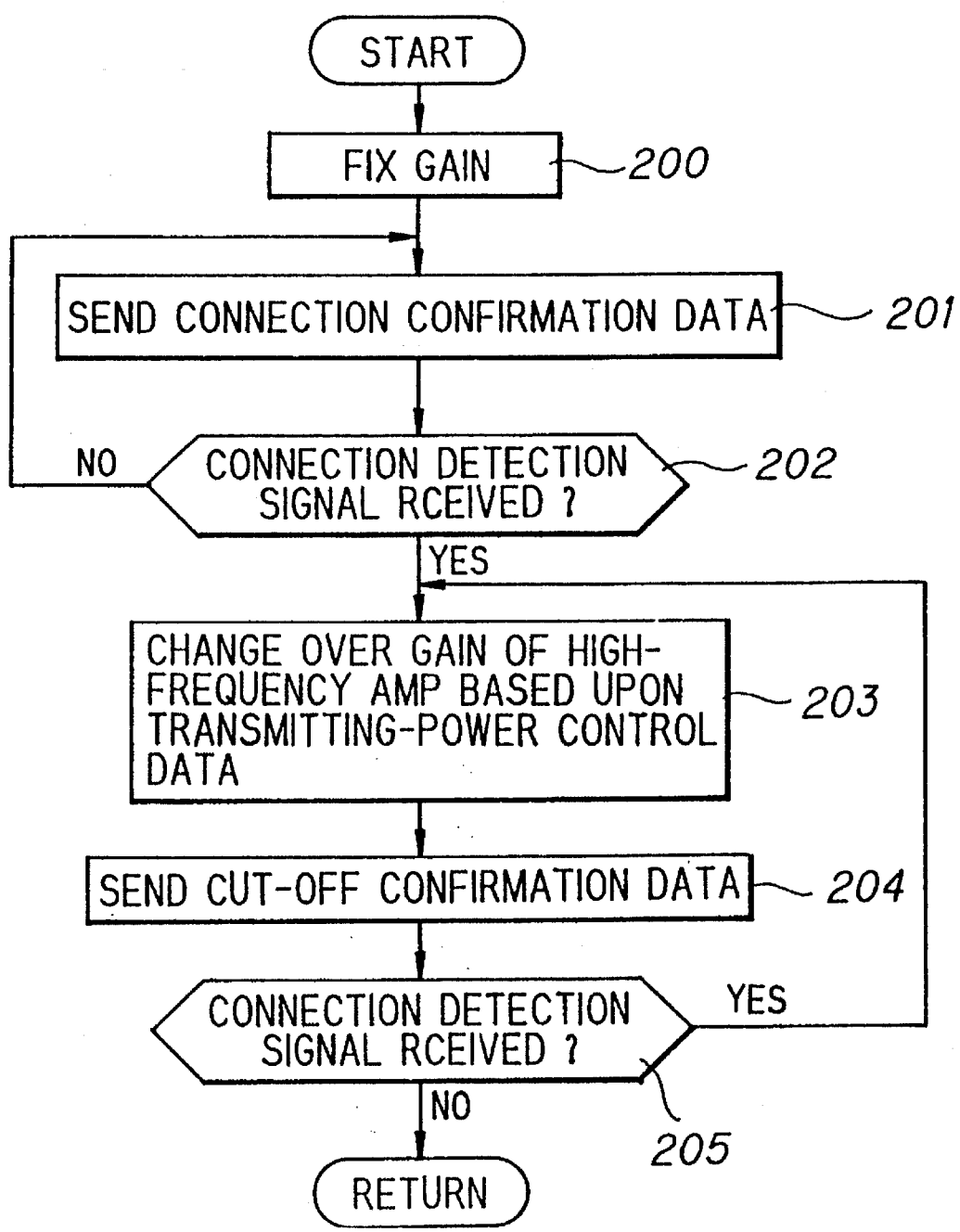
FIG. 5 is a flowchart of processing for controlling the transmitting power of a booster device.

FIG. 4 is a flowchart of transmitting-power control in the controller 21a of the portable telephone terminal 21, and FIG. 5 is a flowchart of transmitting-power control in the controller 41 of the booster device 23.

(1) Transmitting-power control processing in portable telephone terminal

In a case where the portable telephone terminal 21 is used independently without being connected to the booster device 23, the antenna changeover unit 21d (FIG. 3) changes the duplexer 34 over to the antenna 24 so that communication may be performed with a wireless base station.

In this state, the controller 21a of the portable telephone terminal performs monitoring to determine whether the data CNDT, which is for verifying whether a connection has been made or not, has been received from the controller 41 of the booster device 23 (step 101). When power is introduced, the controller 41 transmits the data CNDT periodically via the serial-data line 29b. Accordingly, when the data CNDT is received, the controller 21a takes this as meaning that the portable telephone terminal 21 has been connected to the booster device 23 via the terminal installation rack 22. In a case where the CNDT for detecting whether a connection has been made or not is not received and, hence, the portable telephone terminal 21 has not been connected to the booster device 23, the controller 21a controls the gain of the high-frequency amplifier 31c, based upon the transmitting-power control data sent from the wireless base station, and performs transmission-power control commensurate with sensitivity (step 102).

When the data CNDT has been received, the controller 21a takes this as indicating that the portable telephone terminal 21 has been connected to the booster device 23, fixes the gain of the high-frequency amplifier 31c at the minimum level and minimizes transmitting power (step 103).

Next, the controller 21a generates an antenna changeover signal ASW so that the duplexer 34 is connected to the duplexer 44 of the booster device 23 via the coaxial cable 29a by the antenna changeover unit 21d. Further, the controller 21a generates a power-supply changeover signal PSW so that the voltage outputted by the voltage regulator 22a is fed to each component of the portable telephone terminal 21 by the power-supply changeover unit 21h (step 104).

The controller 21a thenceforth sends the connection detection signal CN to the controller 41 of the booster device 23 via the serial-data line 29c (step 105) and performs monitoring to determine whether the data CNDT is no longer being received. In other words, the controller 21a performs monitoring to determine whether the connection between the portable telephone terminal 21 and the booster device 23 has been broken (step 106).

If the connection between the portable telephone terminal 21 and the booster device 23 has not been broken, the transmitting-power control data PC sent from the wireless base station is transmitted to the controller 41 of the booster device 23 so that transmitting-power control is carried out (step 107). Processing from step 105 onward is then repeated.

If the connection between the portable telephone terminal 21 and the booster device 23 is broken under these conditions, the controller 21a performs control so that the voltage from the batter 21g is supplied to each component by the power-supply changeover unit 21h, and so that the transmitting unit 31 and receiving unit 32 are connected to the antenna 24 via the duplexer 34 by means of the antenna changeover unit 21d (step 108). The program then returns to step 101, whence the foregoing processing is repeated.

Thus, when the portable telephone terminal 21 has not been connected to the booster device, transmitting-power control is carried out in accordance with the transmitting-power control data, which conforms to sensitivity, sent from the wireless base station. However, when the portable telephone terminal 21 is connected to the booster device 23, the transmitting power is fixed at the prescribed low level (the minimum level, for example) and control of transmitting power is not carried out. It should be noted that transmitting-power control in accordance with the transmitting-power control data sent from the wireless base station is performed on the booster side.

(2) Transmitting-power control processing in booster device

When the ignition switch 27 is closed so that voltage is supplied from the vehicle-mounted battery 16, the controller 41 of the booster device 23 places the gain of the transmitting high-frequency amplifier 42 at a fixed level, such as the minimum level (step 200). Herein, the controller 41 can place transmitting power of the booster device 23 at a zero level by switching off the transmitting high-frequency amplifier 42 instead of controlling the gain thereof. Next, the controller 41 periodically outputs the data CNDT, which is for verifying whether a connection has been made or not, to the serial-data line 29b (step 201), and checks to determine whether the connection detection signal CN has been received from the portable telephone terminal 21 (step 202).

When the signal CN is received, the controller 41 controls the gain of the high-frequency amplifier 42 so as to vary the gain over, say, eight stages based upon the transmitting-power control data PC sent from the controller 21a of the portable telephone terminal 21, and executes transmitting-power control commensurate with sensitivity (step 203).

Next, the controller 41 outputs the data CNDT to the serial-data line 29b (step 204) and checks to determine whether the connection detection signal CN is being receiving from the portable telephone terminal 21 (step 205). If the signal CN is being received, the controller 41 executes the processing from step 203 onward. If the signal CN is not being received, this is taken as meaning that the connection between the portable telephone terminal 21 and the booster device 23 has been cut, the program returns to step 200 and processing from this step onward is repeated.

Thus, the controller 41 of the booster device 23 executes transmitting-power control based upon the transmitting-power control data PC when the portable telephone terminal 21 has been connected. If the terminal 21 has not been connected, the controller 41 makes the transmitting power the minimum value.

The foregoing embodiment is for a case in which transmitting power is controlled based upon the transmitting-power control data sent from the wireless base station. However, it is also possible to detect reception field strength on the side of the portable telephone terminal and perform control of transmitting power based upon the reception field strength.

Other Embodiment of Connection Detection

Figure 6:
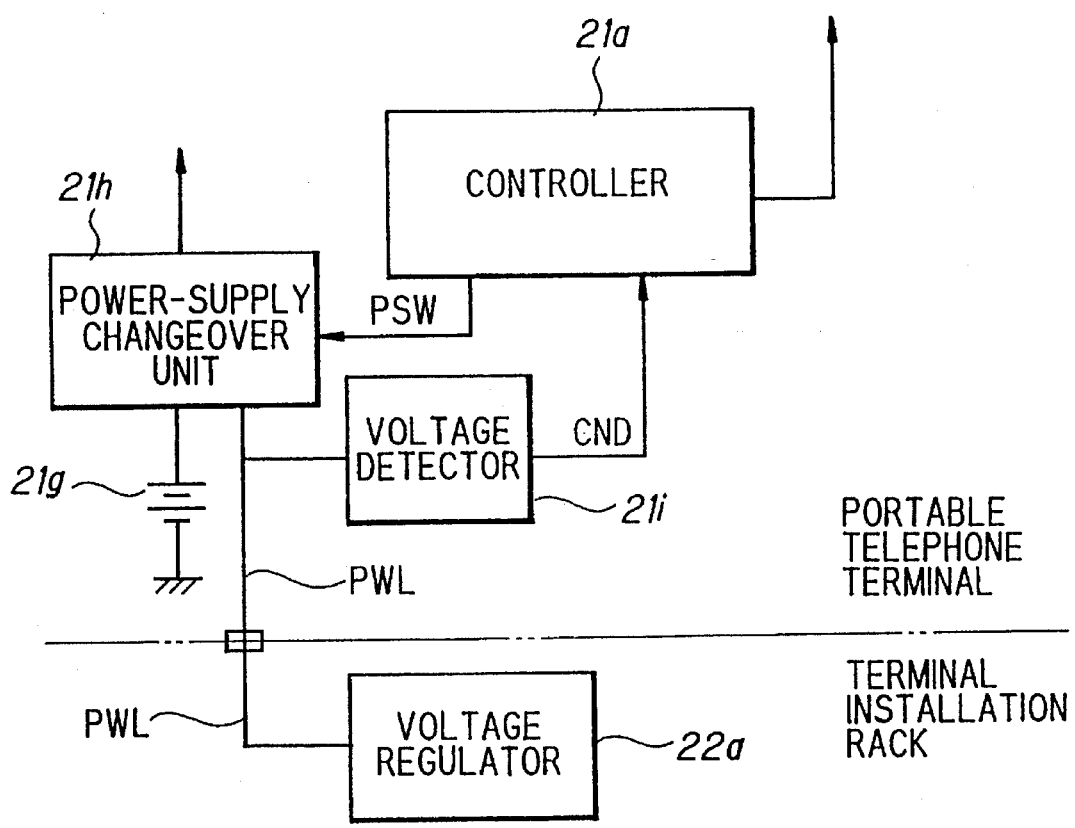
FIG. 6 is a block diagram for describing another embodiment of detecting connection.
Figure 7:
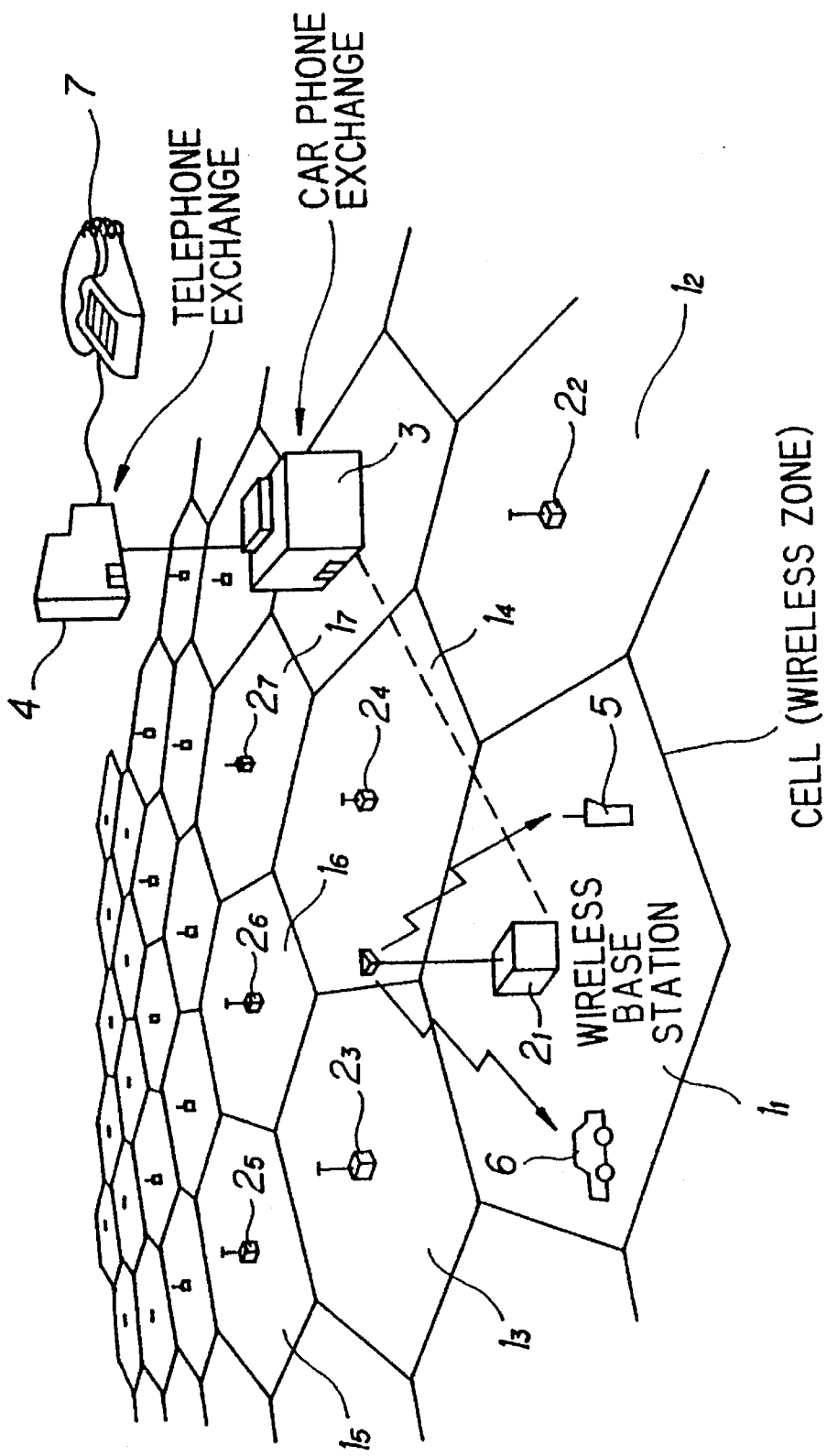
FIG. 7 is a diagram for describing a cellular-type mobile phone system.
Figure 8:
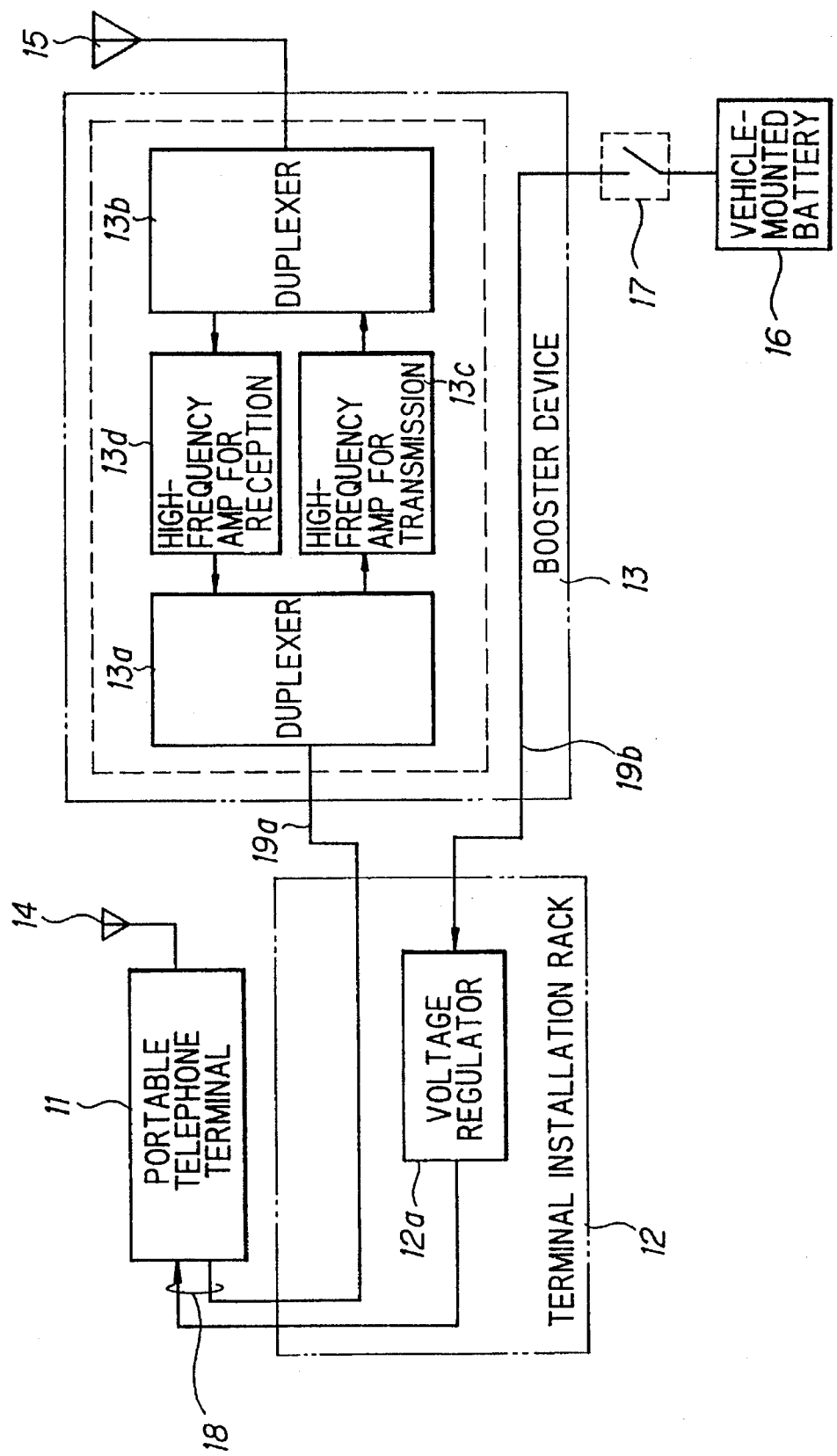
FIG. 8 is a block diagram for describing a mobile telephone apparatus in a case where a conventional booster device is used.

In the foregoing embodiment, an exchange of data (CNDT, CN) is performed between the portable telephone terminal 21 and the booster device 23 to detect whether the two have been connected or not. However, an arrangement of the kind shown in FIG. 6 may also be adopted. Specifically, a power-supply line PWL' of the portable telephone terminal 21 connected to a power-supply line PWL' from the voltage regulator 22a is provided with a voltage detector 21i. When the voltage detector 21i detects a voltage, this is taken as indicating a connection between the portable telephone terminal and the booster device and the detector 21i outputs a high-level connection detection signal CND. When the voltage detector 21i does not detect a voltage, this is taken as indicating no connection between the portable telephone terminal and the booster device and the detector 21i sends the connection detection signal CND to the low level.

The controller 21a monitors the level of the connection detection signal CND at all times, executes the processing from step 103 (FIG. 4) onward when CND attains the high level and executes the processing of step 108 when CND reverts to the low level. In this case, the controller 41 of the booster device 23 executes the processing of FIG. 5 but the steps 201 and 204 are no longer necessary.

Thus, in accordance with the present invention, the transmitting power of a portable telephone terminal is placed at a fixed low level (e.g., the minimum level) when the portable telephone terminal has been connected to a booster device. As a consequence, a voltage regulator need only be capable of supplying the minimum power. The rated capacity of each component can be reduced and the apparatus can be made small in size. This makes it possible to reduce the overall size and cost of the voltage regulator.

Further, in accordance with the present invention, by sending the data for controlling transmitting power from the side of the portable telephone terminal to the controller of the booster device, transmitting-power control commensurate with sensitivity can be performed in the same manner as before.

As many apparently widely different embodiments of the present invention can be made without departing from the spirit and scope thereof, it is to be understood that the invention is not limited to the specific embodiments thereof except as defined in the appended claims.

What is claimed is:

1. In a mobile telephone apparatus comprising in combination a portable telephone terminal a vehicle-mounted booster device a vehicle-mounted battery and a voltage regulator for converting a voltage from the vehicle-mounted battery to a predetermined voltage and supplying the portable telephone terminal with the predetermined voltage, and performing communication with a wireless base station via a vehicle-mounted antenna, said portable telephone terminal comprising:
means for detecting that the portable telephone terminal has been connected to the vehicle-mounted booster device;
means for decreasing transmitting power of the portable telephone terminal to a predetermined constant low level;
means for supplying transmitting power control data sent from the wireless base station to the vehicle mounted booster device; and means for changing connection of a transceiver built in the portable telephone terminal from an own antenna thereof to said vehicle-mounted antenna, and said booster device comprising
means for controlling the transmitting power of said booster device based upon data which is supplied from said supplying means so as to control the transmitting power of the booster device in accordance with the transmitting power control data which is sent to said portable telephone terminal from the wireless base station wherein:
when said detecting means detects that the portable telephone terminal has been connected to the vehicle-mounted booster device, the voltage regulator supplies the predetermined voltage to the portable telephone terminal, said decreasing means decreases the transmitting power of the portable telephone terminal to the predetermined constant low level, said supplying means supplies the transmitting-power control data to the vehicle-mounted booster, said changing means changes the connection of the transceiver-to the vehicle-mounted antenna, and said controlling means of the booster device controls the transmitting power of said vehicle-mounted booster based upon the transmitting power control data.

2. In a mobile telephone apparatus comprising in combination a portable telephone terminal and a vehicle-mounted booster device and performing communication with a wireless base station via a vehicle-mounted antenna, said portable telephone terminal comprising:
means for detecting that the portable telephone terminal has been connected to the vehicle-mounted booster device;
means for decreasing transmitting power of the portable telephone terminal to a predetermined constant level when said detecting means detects that the portable telephone terminal has been connected to the vehicle-mounted booster device; and means for performing control so as to vary the transmitting power of the booster device when said detecting means detects that the portable telephone terminal has been connected to the vehicle-mounted booster device, and said booster device comprising:

means for controlling the transmitting power of said booster device based upon data which is sent from said control performing means of said portable telephone terminal so as to control the transmitting power of the booster device in accordance with transmitting-power control data which is sent to said portable telephone terminal from the wireless base station; and means for detecting whether or not the portable telephone terminal has been connected with said booster device, wherein:

said controlling means places the transmitting power of the booster device at a zero level if said portable telephone terminal has not been connected with said booster device, and wherein said detecting means of the portable telephone terminal detects connection or nonconnection thereof with said booster device, based upon whether or not data transmitted from the booster device is being received, and said detecting means of said booster device detects connection or nonconnection based upon whether or not data transmitted from the portable telephone terminal is being received.

* * * * *